United States Patent [19]

Takahashi

[11] 4,044,391
[45] Aug. 23, 1977

[54] CASSETTE TAPE RECORDERS

[75] Inventor: Akira Takahashi, Seki, Japan

[73] Assignee: Fulton Electronic Industry, Ltd., Aichi, Japan

[21] Appl. No.: 554,864

[22] Filed: Mar. 3, 1975

[30] Foreign Application Priority Data

July 30, 1974 Japan .................................. 49-87841
July 30, 1974 Japan .................................. 49-87842

[51] Int. Cl.² ...................... G11B 15/00; G11B 15/18
[52] U.S. Cl. ........................................ 360/96; 360/93
[58] Field of Search .................................. 360/93, 96

[56] References Cited

U.S. PATENT DOCUMENTS

| 3,632,113 | 1/1972 | Nakamura | 360/96 |
|---|---|---|---|
| 3,719,364 | 3/1975 | Hessland | 360/96 |
| 3,764,089 | 10/1973 | Yoshida | 360/96 |
| 3,893,186 | 7/1975 | Yoshii | 360/96 |

Primary Examiner—Jay P. Lucas
Attorney, Agent, or Firm—Irvin A. Lavine

[57] ABSTRACT

A cassette tape recorder particularly featured by the improved apparatus for insertion, holding and removal of a tape cassette. The apparatus comprises a movable chassis rotatably supported on a stationary chassis and an elongate metal strip extending along one side of the movable chassis and slidably supported by the stationary chassis. A tension spring is fastened to the movable chassis at one end, while its other end is secured to the slidable metal strip. A rotatable L-shaped lever has one end engaged with the slidable metal strip. The other end of the L-shaped lever is engaged with a latching member adapted to maintain the one end of the L-shaped lever in restrictive engagement with the slidable metal strip to prevent the strip from movement under the action of the tension spring, so that the tension spring acts to pull the movable chassis toward the metal strip to rotate the movable chassis into its lowered position during insertion of a tape cassette. An unlatching member is associated with the latching member to allow the L-shaped lever to release its restrictive engagement with the metal strip to permit movement of the latter under the action of the tension spring. The movable chassis includes a projection which is perpendicular to the slidable metal strip, and the metal strip includes a cooperating projection adjacent to the projection on the movable chassis. The projection on the strip pushes the projection on the movable chassis forward to rotate the latter into its raised position for removal of the tape cassette.

7 Claims, 7 Drawing Figures

CASSETTE TAPE RECORDERS

BACKGROUND OF THE INVENTION

This invention relates to a cassette tape recorder. More particularly, it is concerned with the insertion and removal of a cassette tape into or from a tape cassette recorder.

A typical apparatus known in the art as the "Staar" system comprises a movable chassis into which a tape cassette is inserted. The movable chassis is turned from its tilted position into its upright position relative to a stationary or main chassis when a tape cassette is inserted thereinto. Upon removal of the tape, the movable chassis is brought back to its initial position under the action of a spring. The movable chassis carries thereon tape driving components, such as an electric motor, a flywheel, a capstan and a reel, which add considerably to the weight of the movable chassis. The movable chassis is linked to the stationary chassis. A relatively large amount of force is required to push the movable chassis against the action of the spring in order to insert the tape into position. In an attempt to provide a solution to this problem, there is known a modified apparatus employing a pair of different springs adapted to act in opposite directions in order to move a movable chassis in one direction for insertion of a tape cassette under the action of one spring and in the opposite direction for removal of the tape under the action of the other spring. This apparatus, however, requires an additional device for cancelling the action of either spring when the action of the other spring is to be relied upon for tape insertion or removal. The apparatus is necessarily larger in dimensions and more complicated in construction than practically reasonable. The "Staar" system has another critical disadvantage. When the movable chassis is loaded with a tape cassette in its upright position, it is very liable to vibration or other undesirable movement. Any vibration or impact acting on the tape recorder tends to be enlarged or amplified in the movable chassis and adversely affect the tape driving components and their function or operation including transport of the tape. This drawback turns out to be serious, especially in the case of a tape recorder designed for use in an automobile, which is one of the most important applications of apparatus of the sort which constitutes the subject matter of this invention.

SUMMARY OF THE INVENTION

This invention provides a cassette tape recorder in which a movable chassis mounting a tape driving mechanism thereon is rotatably supported on a stationary chassis in such a fashion that the center of gravity of the movable chassis including the tape driving mechanism is positioned substantially on the axis of rotation of the movable chassis. An elongate slide member is slidably supported by the stationary chassis and a tension spring is fastened to the movable chassis at one end, while the other end of the tension spring is secured to the slide member. A rotatable L-shaped lever is engaged with the slide member at one end and insertion of a cassette tape causes the L-shaped lever to rotate in one direction to move the slide member in a direction opposing the force which the tension spring exerts on the slide member. The other end of the L-shaped lever is engaged by a latching member which is adapted to maintain the L-shaped lever in the position where the one end of the L-shaped lever prevents the slide member from moving in the opposite direction under the action of the tension spring, during tape insertion and thereafter until an unlatching member is operated. The tension spring urges the movable chassis to rotate into its operative position as long as restriction to the slide member continues as described. The movable chassis includes a projection extending perpendicularly to the slide member. Likewise, the slide member is formed with a cooperating projection adjacent to the projection on the movable chassis. The projection on the slide member is spaced apart from the projection on the movable chassis as long as the restriction to the slide member as described continues. Thus, the movable chassis is allowed to rotate into its operative position under the action of the tension spring to accomplish operational engagement of the tape driving mechanism with the cassette tape. Upon actuation of the unlatching member either manually or automatically, the L-shaped lever releases its restriction on the slide member and the slide member moves in the opposite direction under the action of the tension spring. The projection on the slide member abuts against the counterpart on the movable chassis and pushes it forward under the action of the tension spring, whereby the movable chassis is rotated into its inoperative position.

It is an object of this invention to provide a cassette tape recorder which ensures the stability of a tape driving mechanism, whether during insertion or removal of a cassette tape or throughout the operation.

It is another object of this invention to provide a tape cassette recorder which permits easy insertion or removal of a tape cassette with only a slight amount of force.

It is still another object of this invention to provide a cassette tape recorder which is compactly designed and employs a simple but reliable apparatus for insertion or removal of a tape cassette.

It is a further object of this invention to provide a cassette tape recorder which may be subjected to any usual vibration or impact without development of any problem in its satisfactory operation and be particularly useful for installation in an automobile.

It is a still further object of this invention to provide a cassette tape recorder for home or portable use which way be placed in any reasonably inclined position without losing its satisfactory operation or stability of the tape driving mechanism.

DETAILED DESCRIPTION

Figure 1:
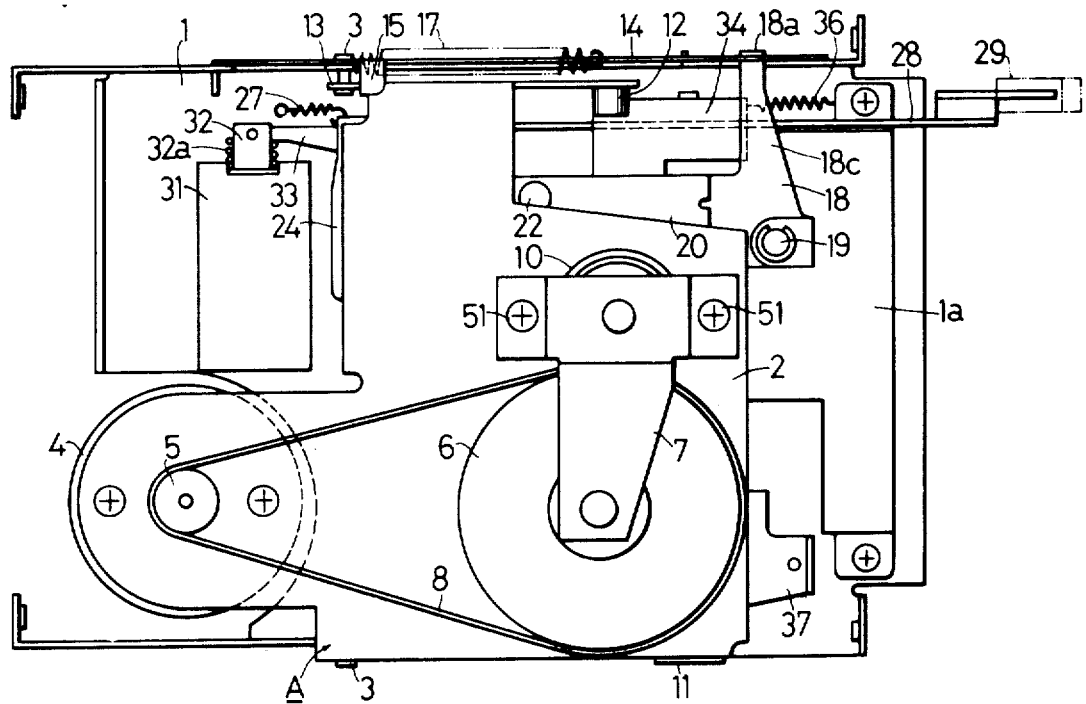
FIG. 1 is a partly omitted plan view of a cassette tape recorder according to a preferred embodiment of this invention.

The cassette tape recorder of this invention comprises a casing in which a main or stationary chassis 1 is fixed. A movable chassis 2 is rotatably supported on the stationary chassis 1 by a pair of pins 3 and is rotatable about the pins 3. The movable chassis 2 mounts thereon a tape driving mechanism A which comprises an electric motor 4, a flywheel 6, a capstan 9 and a reel 10. The motor 4 is provided at one end of the movable chassis 2 and its output shaft is connected to a driving pulley 5. Adjacent to the opposite end of the movable chassis 2 from the motor 4 with respect to an imaginary line connecting the pins 3, there is provided a bracket 7 which is supported on the movable chassis 2 by a pair of screws 51 at one end and spaced above the movable chassis 2 to define a gap 52 between the upper surface of the movable chassis 2 and the lower surface of the bracket 7. The flywheel 6 is rotatably supported in the gap 52 by the movable chassis 2 and the bracket 7 and is rotatable about its own axis. The capstan 9 is connected to the axis of the flywheel 6 and extends downwardly from the movable chassis 2. A driving belt 8 is passed around the driving pulley 5 and the flywheel 6 to transmit the rotation of the motor 4 to the capstan 9 at an adequately reduced rate, while compensating for any possible slight variation in the speed of rotation of the motor 4. The flywheel 6 is supported at the other end of the bracket 7. At the one end of the bracket 7, the reel 10 is rotatably supported in the gap 52 by the movable chassis 2 and the bracket 7. The reel 10 is rotatable about an axially extending reel shaft not shown upon transmission of rotation from the flywheel 6 through a driving belt not shown. THe imaginary line connecting the pins 3 is located at or adjacent to the center of gravity of the movable chassis 2 and the tape driving mechanism A mounted thereon.

Figure 2:
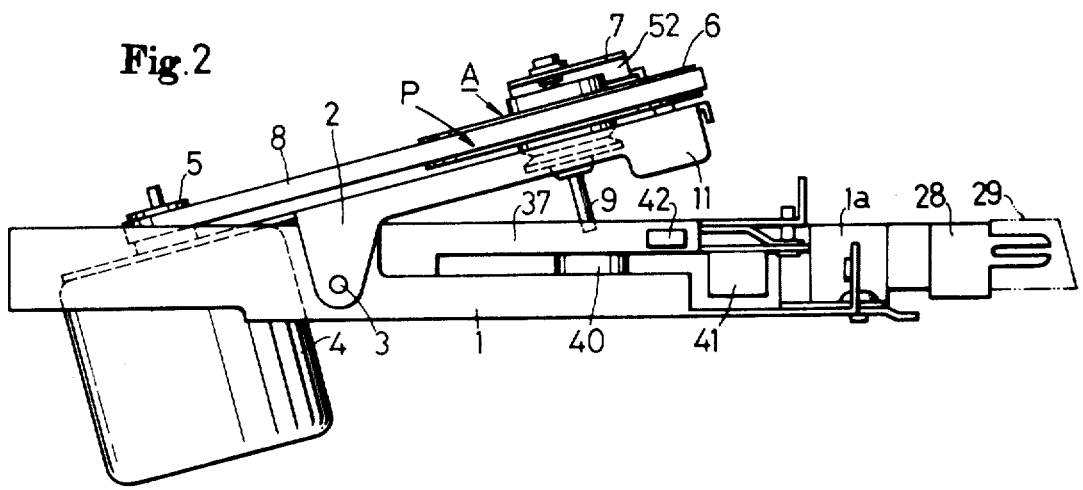
FIG. 2 is a front elevational view of the apparatus shown in FIG. 1.
Figure 4:
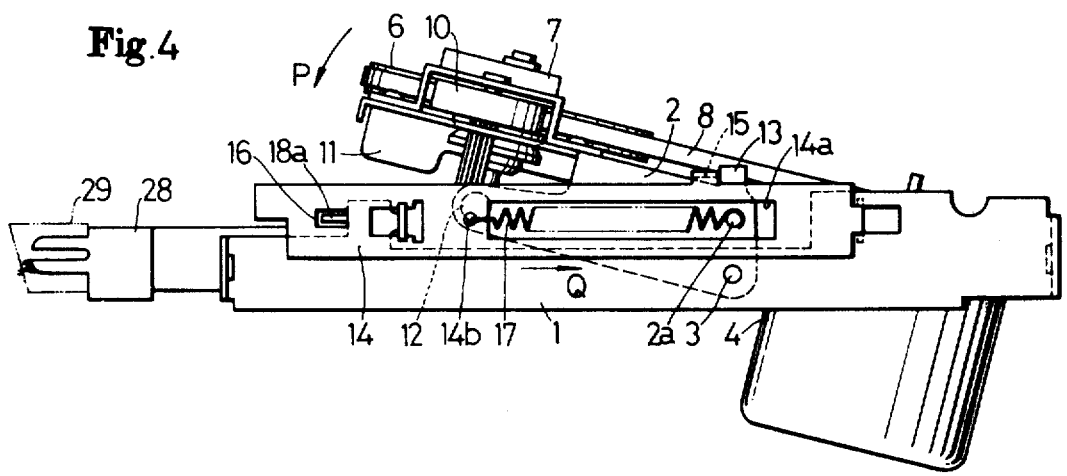
FIG. 4 is a rear view of the apparatus shown in FIG. 3.

An elongate slide member 14 is provided on one side of the stationary chassis 1 as shown at the upper edge of FIG. 1 and is horizontally reciprocable along the stationary chassis 1. The slide member 14 comprises an elongate, generally rectangular strip and is formed at the upper edge thereof with an L-shaped projection 15 as shown in FIGS. 1 and 4. The movable chassis 2 is formed with an upwardly extending projection 13 adjacent to one of the pins 3 as shown in FIGS. 1 and 4. The projection 15 of the slide member 14 is engageable with the projection 13 of the movable chassis 2 as illustrated in FIG. 4. The slide member 14 is formed along a portion of its length with an elongate rectangular slot 14a as shown in FIG. 4. The movable chassis 2 is formed with a laterally extending pin 2a in a position between the projection 13 and one of the pins 3 and adjacent to one end of the slot 14a of the slide member 14. The slide member 14 is formed with a small aperture 14b adjacent to the other end of the slot 14a. A tension spring 17 is provided in the slot 14a and secured at one end to the pin 2a of the movable chassis 2, while the other end of the tension spring 17 is secured in the aperture 14b of the slide member 14, as illustrated in FIG. 4. The slide member 14 is made of a metal strip and slidably engaged at both ends with the adjacent side wall of the stationary chassis 1. When the slide member 14 is supported against the action of the spring 17 by the free end 18a of a first arm 18c of a generally L-shaped lever 18, the movable chassis 2 is urged by the spring 17 to rotate downward about the pins 3 in the direction of an arrow P in FIGS. 2 and 4. On the other hand, when the movable chassis 2 is supported unrotatably, the spring 17 urges the slide member 14 to move in the direction of an arrow Q in FIG. 4. When the tape recorder is in its unloaded position (having no cassette tape inserted therein) as illustrated in FIG. 2 or 4, the movable chassis 2 is prevented from rotating downward in the direction of the arrow P because a roller 12 provided on the movable chassis 2 rests on the upper surface of a starting member 34. Accordingly, the spring 17 pulls the slide member 14 in the direction of the arrow Q and the projection 15 of the slide member 14 abuts against the projection 13 of the movable chassis 2.

Figure 3:
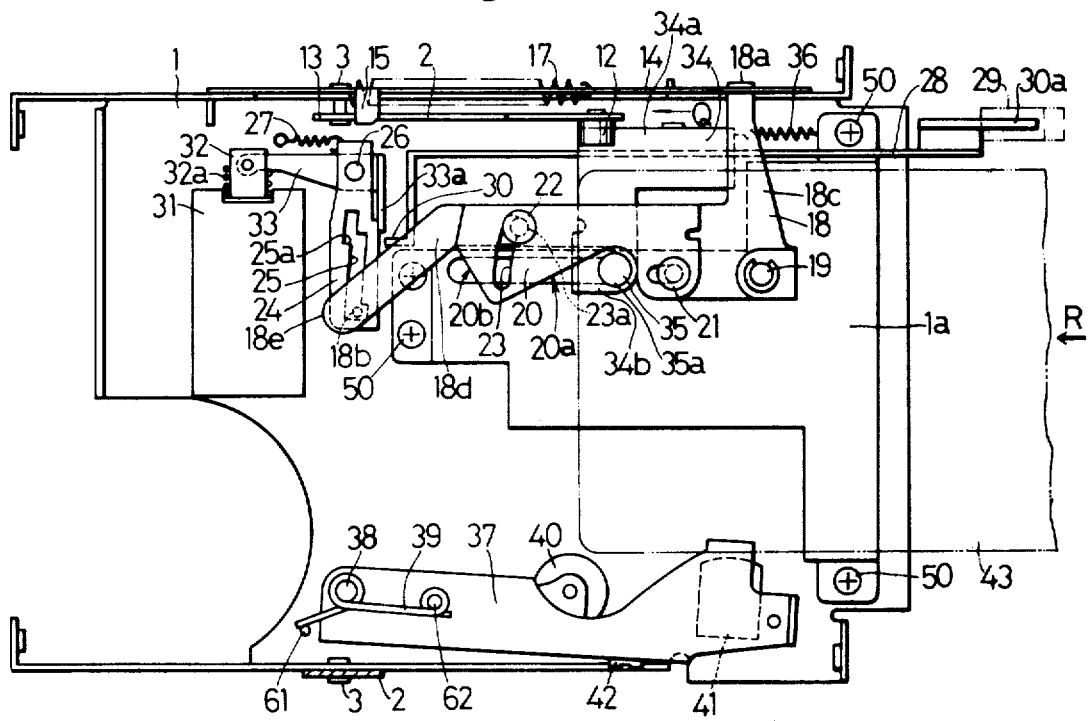
FIG. 3 is a view similar to FIG. 1 in which the apparatus is shown with its movable chassis omitted and which shows a cassette tape being inserted into the apparatus.
Figure 5:
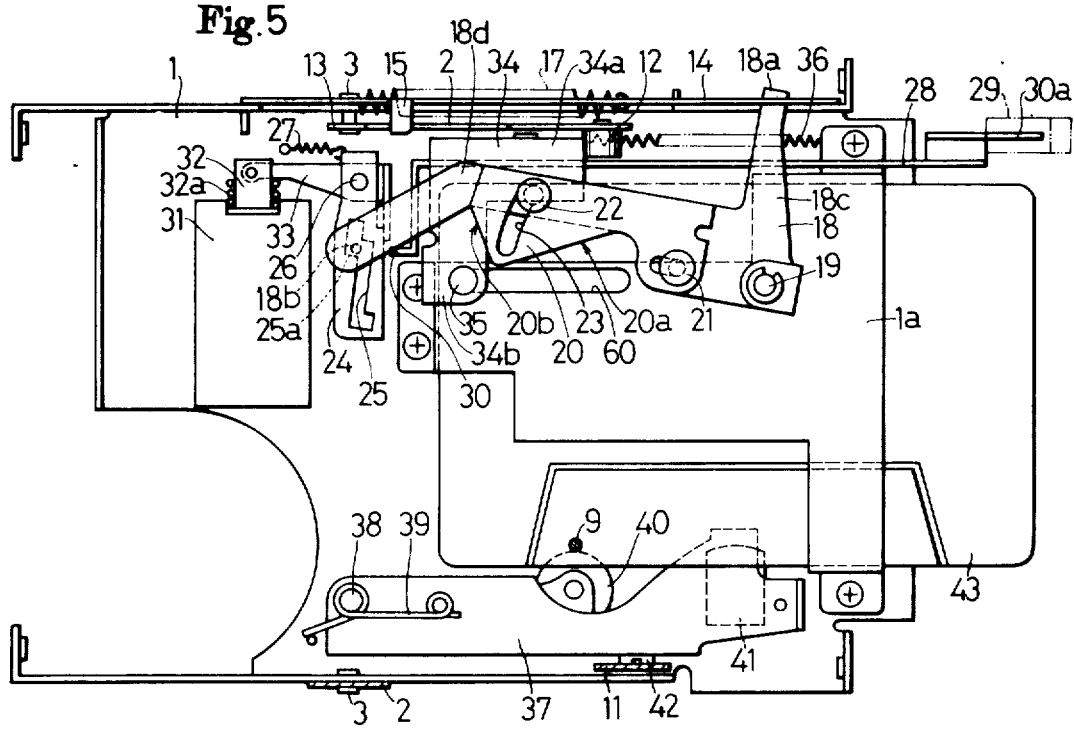
FIG. 5 is a view similar to FIG. 3 showing the cassette tape fully inserted in position.
Figure 6:
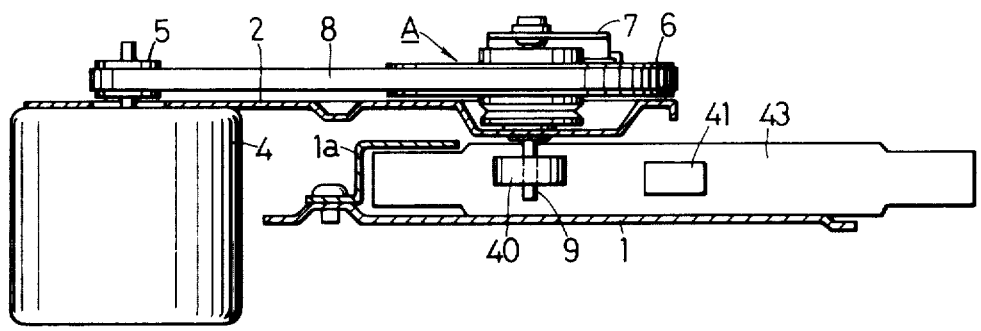
FIG. 6 is a front elevational view, partly in section, of the apparatus shown in FIG. 5.
Figure 7:
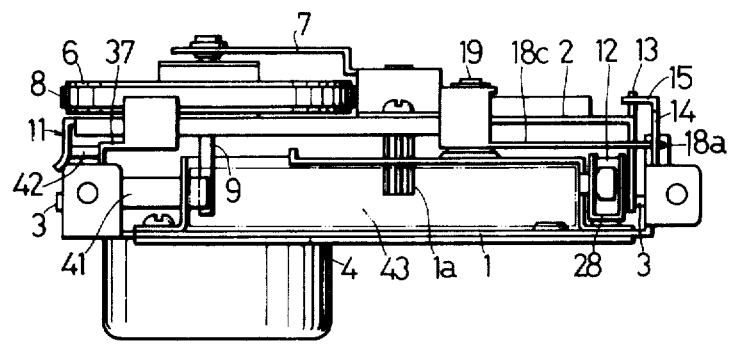
FIG. 7 is a right-hand side elevational view of the apparatus shown in FIG. 5.

Another or second stationary chassis 1a is secured to the first stationary chassis 1 by a plurality of screws 50. The second stationary chassis 1a is spaced above the first stationary chassis 1 to define therebetween a clearance into which a tape cassette may be slipped as indicated at 43 in FIG. 6. A pin 19 extends upwardly from the second stationary chassis 1a as shown in FIG. 7. The L-shaped lever 18 is rotatably supported on the pin 19 as illustrated in FIG. 3 or 5. The slide member 14 is provided with an elongate aperture 16 on the opposite side of the circular aperture 14b from the slot 14a as shown in FIG. 4. The free end 18a of the first arm 18c of the lever 18 is engaged in the elongate aperture 16 of the slide member 14 as shown in, for example, FIGS. 1 and 4. A pair of longitudinally spaced pins 21 and 22 are formed on a second arm 18d of the lever 18. A hook member 20 is positioned between the other end 18e of the lever 18 and the pin 19 on which the lever 18 is rotatably supported. One pin 21 of the lever 18 is engaged in an aperture formed in the hook member 20 adjacent to the first arm 18c of the lever 18. The hook member 20 is also formed with an elongate, arcuately curved aperture 23 in a position between the one pin 21 and the other end 18e of the lever 18. The arcuately curved aperture 23 includes a semicircular latch recess 23a at one end thereof as indicated in FIG. 3. The other pin 22 of the lever 18 normally rests in the latch recess 23a, but is disengageable therefrom. Upon disengagement of the pin 22 from the recess 23a, the hook member 20 is rotatable about the one pin 21, independently of the lever 18, by an angular distance corresponding to the length of the aperture 23.

The lever 18 is formed with a third pin 18b at the free end 18e of its second arm 18d. A locking member 24 is rotatably supported on the stationary chassis 1 by a pin 26 and includes an elongate aperture 25 extending along the length of the locking member 24. The pin 18b of the lever 18 extends into the aperture or slit 25 of the locking member 24. The slit 25 includes a shoulder 25a at one end thereof. A tension spring 27 is secured to the stationary chassis 1 at one end and the other end of the spring 27 is fastened to the opposite end of the locking member 24 from the slit 25 with respect to the pin 26. The tension spring 27 urges the free end of the locking member 24 toward the lever 18 is such a fashion that when the lever 18 is in its rotated position as illustrated in FIG. 5, the pin 18b of the lever 18 is held against the shoulder 25a of the locking member 24. The stationary chassis 1 further supports an elongate return leaver 28 which is positioned adjacent to the slide member 14 and extends in parallel thereto. One or the inner end 30 of the return lever 28 is located close to the locking member 24, while the other or outer end 30a of the lever 28 is exposed on the front side of the machine and carries a handle 29 thereon, which may be pressed to move the lever 28 inwardly. The inner end 30 of the lever 28 is usually kept away from the free end of the locking member 24 by the action of a spring not shown, but is engageable therewith when the lever 28 is forcibly moved inwardly. Such engagement causes the locking member 24 to rotate about the pin 26 in a clockwise direction as viewed in FIG. 5 by overcoming the action of the tension spring 27, whereby the pin 18b of the L-shaped lever 18 is disengaged from the shoulder 25a of the locking member 24.

Another means is provided for releasing the pin 18b of the L-shaped lever 18 from the shoulder 25a of the locking member 24. It is a lever 33 rotatably supported on the pin 26 on which the locking member 24 is rotatably supported. An electric circuit for the tape recorder includes a solenoid 31 having a plunger 32 associated with a compression spring 32a. While the electric circuit is on, the solenoid 31 maintains the plunger 32 in its attracted position by overcoming the action of the spring 32a, but upon de-energization of the solenoid 31, the spring 32a causes the plunger 32 to project. The lever 33 is connected to the plunger 32 at the end. THe other end of the lever 33 is located on the opposite side of the locking member 24 from the plunger 32 and has an upturned extremity contacting the adjacent side edge of the locking member 24. Upon projection of the plunger 32, the lever 33 rotates about the pin 26 clockwise (FIG. 5) and the other end of the lever 33 moves the locking member 24 clockwise about the pin 26 against the action of the tension spring 27, whereupon the pin 18b of the L-shaped lever 18 is released from the shoulder 25a of the locking member 24 as illustrated in FIG. 3.

The second stationary chassis 1a has a slot 60 formed along one edge thereof and extending substantially in parallel to the second arm 18d of the L-shaped lever 18 illustrated in FIG. 5. The hook member 20 includes an angularly curved longitudinal edge defining a first cam profile 20a and a second cam profile 20b extending in opposite directions from the elongate aperture 23. The starting member 34 has an L-shaped canfiguration comprising a first leg 34a extending in a close and parallel relation to an adjacent side wall of the movable chassis 2 and a second leg 34b extending at right angles to the first leg 34a. The second leg 34b extends into the clearance between the second stationary chassis 1a and the L-shaped lever 18. The free end of the second leg 34b projects beyond the hook member 20 and carries thereon a guide pin 35 extending through the slot 60 of the second stationary chassis 1a. The guide pin 35 is formed at one end with an enlarged circular head 35a which is engageable with the cam profiles 20a and 20b of the hook member 20. A tension spring 36 extends in the same direction as the first leg 34a and is fastened to the first leg 34a at one end, while the other end of the spring 36 is connected to the stationary chassis 1a. The tension spring 36 normally maintains the starting member 34 in its retracted position as illustrated in FIG. 3. Upon insertion of a tape cassette 43 into the space between the first and second stationary chassises 1 and 1a, the cassette 43 engages the starting member 34 and moves it forward by overcoming the action of the tension spring 36 as the guide pin 35 slides in the guide slot 60 with its circular head 35a rolling along the cam profile 20a, until the starting member 34 reaches its innermost position as shown in FIG. 5. The roller 12 projecting inwardly from the side wall of the movable chassis 2 is rotatably supported on the first leg 34a of the starting member 34 to prevent the rotation of the movable chassis 2 in the direction of the arrow P (FIG. 4) which would otherwise take place by the action of the tension spring 17. The roller 12 remains supported on the starting member 34 during the sliding movement of the latter, but when a tape cassette has been completely inserted, the roller 12 ceases to rest on the starting member 34 and permits rotation of the movable chassis 2 in the direction of the arrow P.

A head plate 37 is rotatably supported at one end by a pin 38 on the stationary chassis 1 and carried a pinch roller 40 and a recording or playback head 41 thereon in a known manner. A looped wire spring 39 is wound on the pin 38 and supported at one end by a pin 61 on the stationary chassis 1, while the other end of the spring 39 is fastened to another pin 62 on the head plate 37. The spring 39 serves to normally maintain the head plate 37 in its retracted or inoperative position as shown in FIG. 3. The movable chassis 2 includes an outwardly curved depending tab 11 as shown in FIG. 4 or 7. The head plate 37 has a laterally projecting lug 42 as shown in FIG. 3, 5 or 7. The tab 11 is adapted, upon rotation of the movable chassis 2 in the direction of the arrow P, to engage the free end of the lug 42. As it moves down, the tab 11 presses against the lug 42 to rotate the head plate 37 about the pin 38 in a counterclockwise direction as viewed in FIG. 3 by overcoming the action of the spring 39, whereby the head plate 37 is brought into its advanced or operative position as illustrated in FIG. 5.

In operation, a tape cassette 43 is inserted into the tape recorder in its initial position as best shown in FIGS. 3 and 4. As its is moved in the direction of an arrow R in FIG. 3, the leading edge of the cassette 43 engages the starting member 34 and moves it inwardly by overcoming the action of the spring 36. The rotatable pin 35 on the starting member 34 abuts against the adjacent cam profile 20a and causes rotation of the hook member 20 about the pin 21 in a clockwise direction. This rotation is quickly followed by rotation of the L-shaped lever 18 about the pin 19 in a clockwise direction as viewed in FIG. 3. The first arm 18c of the lever 18 moves to the right in FIG. 3 and pulls the slide member 14 in a direction opposite to the arrow Q against the action of the spring 17. The projection 15 on the slide member 14 is disengaged from the projection 13 on the movable chassis 2. Although the spring 17 urges the movable chassis 2 in the direction of the arrow P, rotation of the movable chassis 2 in the direction of the arrow P is prevented so long as the roller 12 is supported on the starting member 34.

When the tape cassette 43 is fully inserted into position, the pin 18b on the L-shaped lever 18 is held against the shoulder 25a of the locking member 24 and the locking member 24 maintains the lever 18 in its tilted position as shown in FIG. 5 to maintain the projection 15 away from the projection 13 on the movable chassis 2 against the action of the spring 17. The roller 12 is allowed to move down from the upper surface of the starting member 34 as shown in FIG. 5 as the starting member 34 moves past the roller 12. The spring 17 is now free to act to rotate the movable chassis 2 downwardly in the direction of the arrow P, whereupon the tape driving mechanism is operationally associated with the cassette tape 43. The slide member 14 is operationally connected to a motor switch not shown and upon movement of the slide member 14 in the direction opposite to the arrow Q, the motor switch is turned on to start the operation of the motor 4. Downward movement of the movable chassis 2 also causes rotation of the head plate 37 into its operative position as shown in FIG. 5, whereby the rotating capstan 9 cooperates with the pinch roller 40 to move the tape past the head 41 for recording or playback.

In order to remove the cassette 43 from the machine, one first presses the handle 29 to move the return lever 28 inwardly. The inner end 30 of the lever 28 abuts against the locking member 24 and causes it to rotate against the action of the tension spring 27. The pin 18b on the L-shaped lever 18 is released from the shoulder 25a of the locking member 24 and the lever 18 is now free to rotate about the pin 19. The movable chassis 2 is in its closed or lowered position and is prevented from any further downward rotation in spite of the action of the spring 17. Accordingly, the spring 17 acts to move back the slide member 14 in the direction of the arrow Q and the projection 15 on the slide member 14 abuts against the projection 13 on the movable chassis 2. The projection 15 moves the projection 13 in the direction of the arrow Q by the action of the spring 17, whereby the movable chassis 2 rotates upwardly in the direction opposite to the arrow P. It will be recalled in this connection that the center of gravity of the movable cassis 2 including the tape driving mechanism A mounted thereon is located on or adjacent to an imaginary line connecting the pins 3 about which the movable chassis 2 rotates. Therefore, the spring 17 does not need to be loaded with a very large tension, but a slight amount of pressure exerted by the projection 15 on the slide member 14 in sufficient to rotate the movable chassis 2 upwardly.

The capstan 9 and the shaft of the reel 10 are released from the cassette 43. At the same time, the head plate 37 is disengaged from the tab 11 on the movable chassis 2 and the spring 39 acts to bring back the head plate 37 into its inoperative position as shown in FIG. 3, whereby the pinch roller 40 and the head 41 are disengaged from the tape. Upon movement of the slide member 14 in the direction of the arrow Q, the L-shaped lever 18 returns to its initial position shown in FIG. 3 and the switch for the motor 4 is turned off. Upon rotation of the movable chassis 2 to its uppermost position, the roller 12 moves up to a level which is no longer capable of holding the starting member 34 in its advanced or innermost position as shown in FIG. 5. The spring 36 acts to move back the starting member 34 to its retracted position as shown in FIG. 3 as the roller 12 rests and rotates on the starting member 34, whereby the tape cassette 43 is released from the machine. As the starting member 34 moves back, the guide pin 35 abuts against the second cam profile 20b. The oval aperture in which the pin 21 rotatably supports the hook member 20 on the L-shaped lever 18 provides freedom for the hook member 20 to move to a certain extent upon abutment of the guide pin 35 against the second cam profile 20b. This movement of the hook member 20 allows the other pin 22 to be released from the latch recess 23a. The hook member 20 rotates clockwise (FIG. 3) about the pin 21 independently of the lever 18 as the elongate aperture 23 slides past the other pin 22. The rotation of the hook member 20 allows the guide pin 35 to move past the cam profiles 20b and 20a along the guide slot 60 in the stationary chassis 1a.

According to this invention, the foregoing sequence of operations for releasing the cassette from the machine is effected automatically, too, when the power supply to the machine is discontinued in the event, for example, where the tape recorder is so installed in an automobile as to be powered through an ignition switch on an automobile engine. The solenoid 31 is de-energized and the spring 32a causes the plunger 32 to project. The lever 33 rotates clockwise about the pin 26 (in FIG. 5) and the locking member 24 rotates in the same direction against the action of the spring 27, exactly in the same manner as the locking member 24 is pushed by the return lever 28 as hereinbefore described. This arrangement is effective to prevent any deformation or damage to the pinch roller 40 or the tape that would possibly occur if the cassette 43 were left in the tape recorder and the capstan 9 left in engagement with the pinch roller 40 after the tape ceases to travel.

While the invention has been described with reference to a preferred embodiment thereof, it should be understood that variations or modifications may be easily made by those skilled in the art without departing from the scope of the invention which is defined by the appended claims.

What is claimed is:

1. In combination with a cassette tape recorder of the type in which a first stationary chassis and a second stationary chassis spaced above said first stationary chassis defined therebetween a space adapted to receive a tape cassette therein, and in which a tape driving mechanism is mounted on a movable chassis rotatably supported on said first stationary chassis, the improvement which comprises:

an elongate slide member slidably attached to one side wall of said first stationary chassis;

a first tension spring fastened to said movable chassis at its one end and to said slide member at its other end;

means rotatably supported on said second stationary chassis and operatively connected with said slide member for rotation in one direction to move said slide member in one direction for urging said movable chassis into one position under the action of said first tension spring during insertion of said tape cassette into said space;

means engaged with said slide member moving means for latching it to maintain said movable chassis in said one position;

means for acting on said latching means for unlatching said slide member moving means to permit movement of said slide member in the other direction under the action of said first tension spring; and means engaged by said slide member for rotating said movable chassis into another position under the action of said first tension spring during removal of said tape cassette from said space; and wherein said slide member moving means comprises an L-shaped lever rotatably supported at its corner by a pin on said second stationary chassis, and a starting member slidably supported by said second stationary chassis and engageable by said tape cassette during said insertion and removal thereof, said L-shaped lever operatively connected to said slide member by a first arm engaged with said slide member at its free end, and a second arm extending generally at right angles to said first arm and engaged with said latching means at its free end, said starting member comprising means for rotating said L-shaped lever in said one direction of said slide member moving means upon sliding in one direction when pushed by said tape cassette during said insertion thereof.

2. The invention as defined in claim 1 wherein the center of gravity of said movable chassis including said tape driving mechanism is positioned substantially on the axis of rotation of said movable chassis.

3. The invention as defined in claim 2 wherein said means for rotating said movable chassis into said other position comprises a projection formed on said movable chassis and positioned on the opposite side of said one end of said first tension spring from said axis of rotation of said movable chassis; and a projection formed on said slide member adjacent to said projection on said movable chassis, said projection on said slide member being engageable with said projection on siad movable chassis, upon movement of said slide member in a direction opposite to said one direction under the action of said first tension spring, to rotate said movable chassis into said other position.

4. The invention as defined in claim 1 wherein said latching means comprises an elongate plate lever rotatably supported by a pin on said first stationary chassis and having an elongate aperture in which said free end of said second arm of said L-shaped lever is movably engaged; and a second tension spring fastened to one end of said plate lever at one end and to said first stationary chassis at the other end, said elongate aperture being located adjacent to the other end of said plate lever.

5. The invention as defined in claim 4 wherein said second arm of said L-shaped lever includes a pin formed at said free end thereof and movably engaged in said elongate aperture of said plate lever; and wherein said elongate aperture of said plate lever includes a shoulder adapted to hold said pin thereagainst under the action of said second tension spring to maintain said movable chassis in said one position thereof upon said insertion of said tape cassette.

6. The invention as defined in claim 4 wherein said unlatching means comprises an elongate push lever slidably supported by said second stationary chassis and extending along said one side wall of said first stationary chassis, said push lever having a curved inner end positioned adjacent to said other end of said plate lever and an outer end which extends outwardly from said first and second stationary chassises and is manually operable, said inner end of said push lever being engageable with said other end of said plate lever to rotate said plate lever against the action of said second tension spring to permit movement of said second arm of said L-shaped lever.

7. The invention as defined in claim 1; and rotation preventing means for and carried by said movable chassis engaging said starting member for preventing chassis rotation towards said one position except when said starting member is substantially in said inner tape playing position.

* * * * *